Oct. 1, 1968   P. DEFFRENNE   3,403,948
APPARATUS FOR MAINTAINING CLEARANCES IN FLUID
DESIGNS SUBSTANTIALLY CONSTANT
Filed Nov. 21, 1966   3 Sheets-Sheet 1
FIG.1
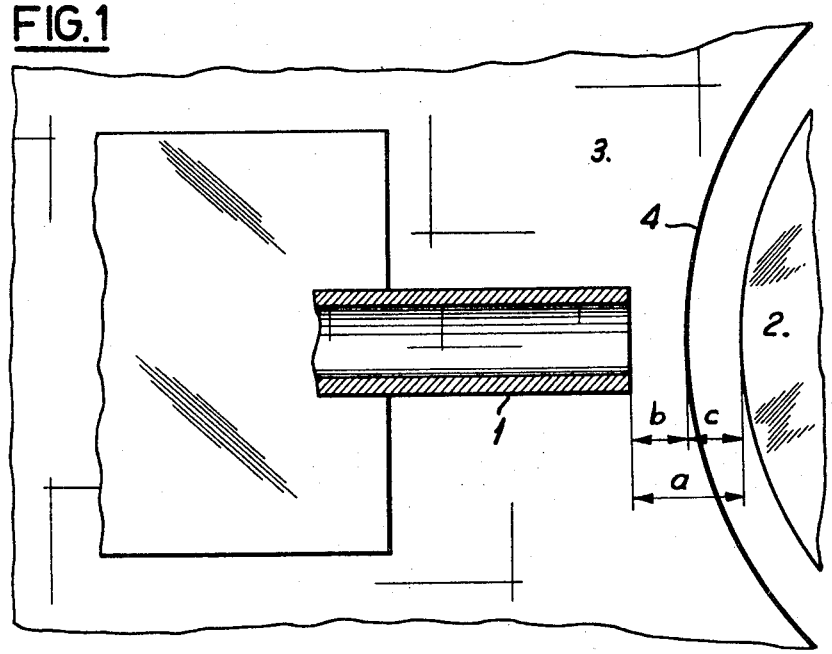
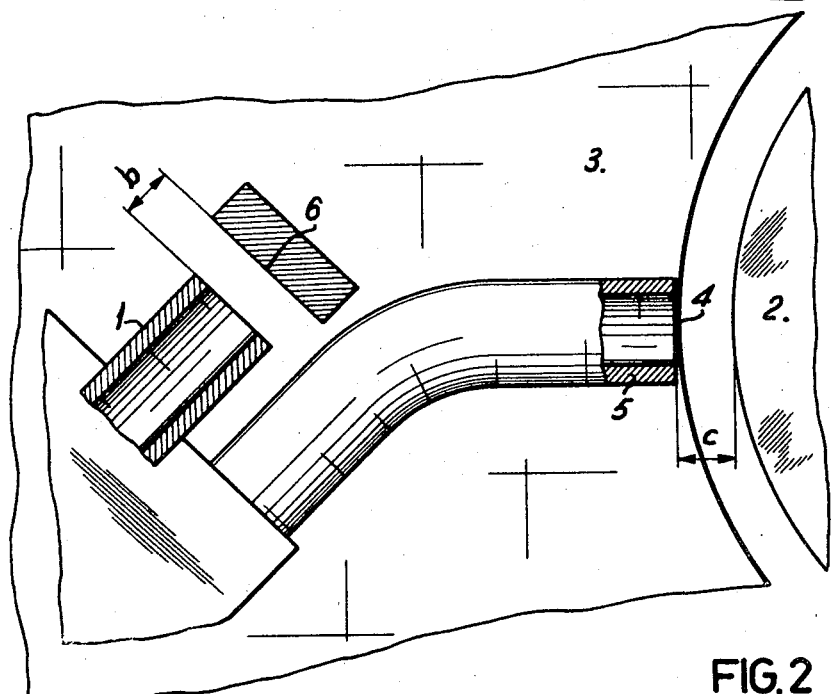
FIG.2
INVENTOR
PAUL DEFFRENNE
BY  Emery L. Groff Jr.
ATTORNEY

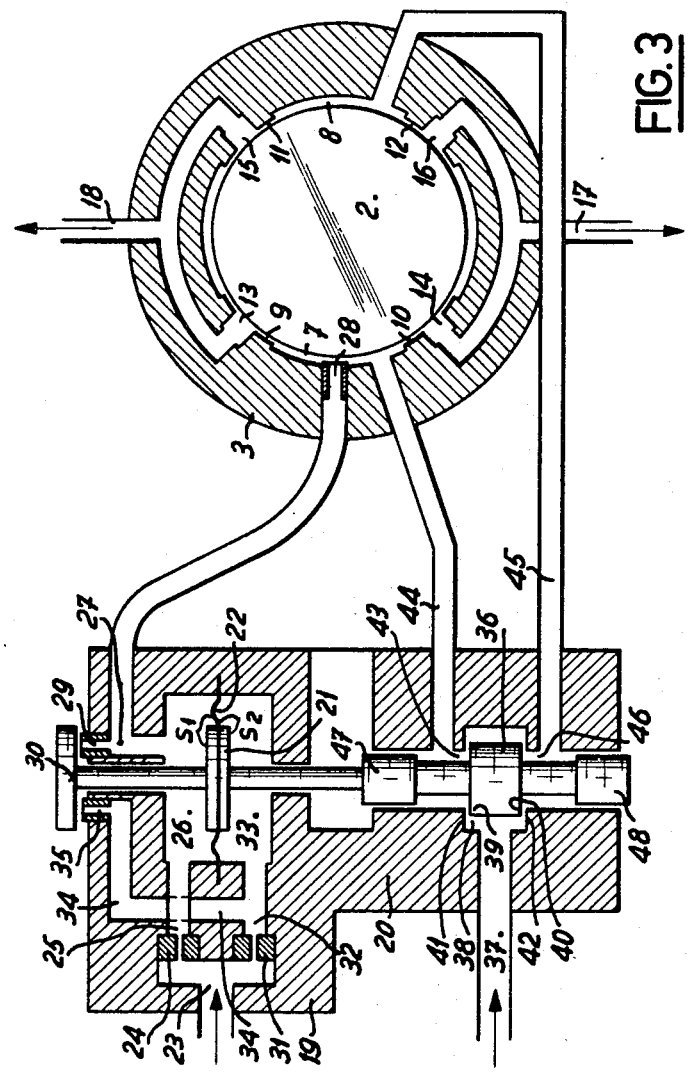

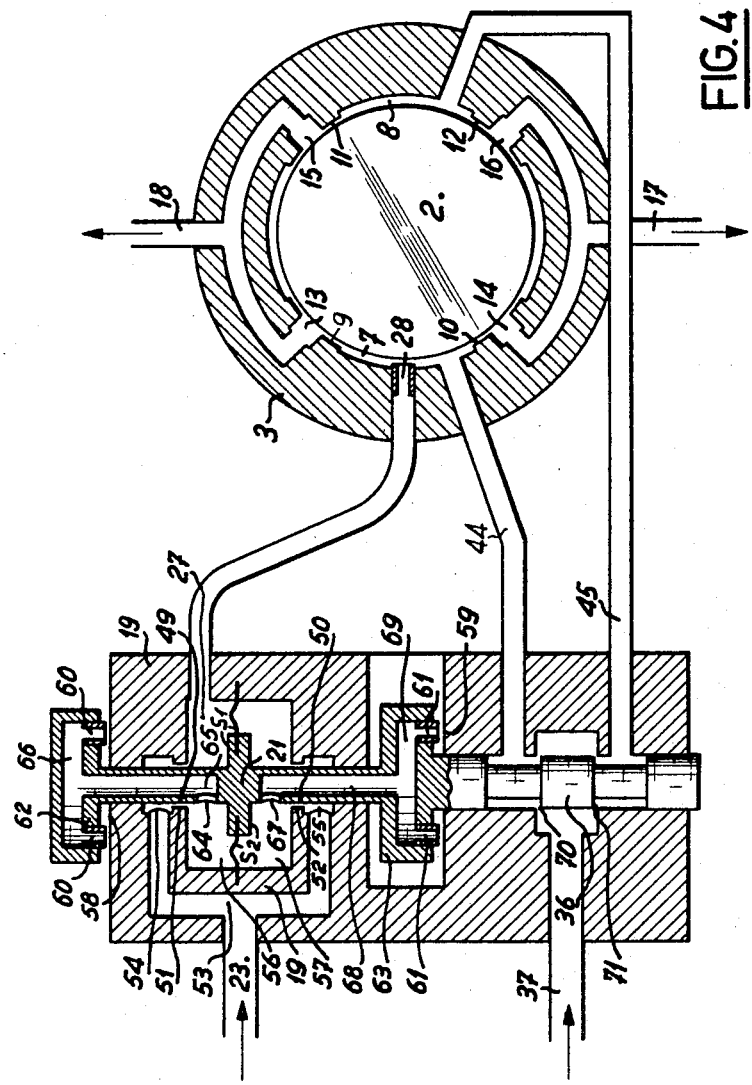

United States Patent Office 3,403,948
Patented Oct. 1, 1968

3,403,948
APPARATUS FOR MAINTAINING CLEARANCES IN FLUID DESIGNS SUBSTANTIALLY CONSTANT
Paul Deffrenne, Geneva, Switzerland, assignor to Mecanorga S.A., Geneva, Switzerland, a company of Switzerland
Filed Nov. 21, 1966, Ser. No. 595,971
Claims priority, application Switzerland, Nov. 29, 1965, 16,444/65
6 Claims. (Cl. 308—122)

This invention relates to apparatus for maintaining clearances in fluid bearings substantially constant at predetermined values, and is concerned with providing apparatus in a form such that most of the apparatus can if necessary be disposed at a location away from the point at which a clearance is to be controlled. In many instances, for example in machine tools, this can avoid the need to provide the necessary space in a zone which may already be very congested.

According to this invention there is provided apparatus for keeping a clearance between two bodies substantially constant at a predetermined value, one of which bodies supports the other, through the intermediary of a pressure operating fluid in two zones opposite each other, against forces producing movements of said other body to alter said clearance, which apparatus comprises control means incorporating two chambers separated by a pressure sensitive element which is subjected to opposing gas pressures applied in the chambers, a source of pressure gas, first and second restricted orifices placing the two chambers respectively in communication with said source, first and second outlets through which gas can escape from one of the chambers, said first outlet being formed in a nozzle fixedly mounted in said one body adjacent a surface of the other body such that relative movement of the bodies altering said clearance alters the effective area of the nozzle outlet in the same sense as the causal variation of the effective area of the first outlet, a third outlet through which pressure gas can escape from the other chamber, and means which moves with the pressure sensitive element and which when so moved varies the effective areas of the second and third outlets, and a valve to which the element is coupled for varying the operating fluid pressures in the two zones in relation to each other to maintain the clearance at said predetermined value, variation of the clearance in either sense from said predetermined value producing a corresponding variation in the effective area of the first outlet which acts to move the element to operate the valve, and the sizes of said orifices and outlets in relation to each other and the operation of the means for varying the effective areas of the second and third outlets being such that the opposing forces on the element are equal only when the clearance has said predetermined value, and that under steady conditions, the forces on the element are balanced when the clearance has said predetermined value whatever the position of the element.

According to a preferred feature of the invention, the second and third outlets comprise respective apertures, and the means for varying the effective areas of these outlets comprise surfaces which face said apertures squarely, the distances of said surfaces from the respective outlets being varied in dependence on the position of the pressure sensitive element.

According to another preferred feature of the invention, two oppositely extending rod members are slidably mounted in the casing of the control means and coupled to the pressure sensitive element, and respectively extend through the two chambers, one of said rod members being coupled to the valve for transmitting movements of the element to the valve and said first and second restricted orifices are annular and are defined by annular gaps formed between the two rod members and respective apertures which are provided in the casing and through which the rod members extend. Preferably each of the rod members is tubular and as an aperture adjacent the element through which aperture the interior of the rod communicates with the chamber containing that member, and wherein the two rod members respectively provide said second and third outlets at their ends remote from the element, which ends move towards and away from fixed surfaces as the pressure sensitive element moves to actuate the valve.

Some embodiments of the invention will now be described by way of example with reference to the accompanying drawings in which:

FIGS. 1 and 2 represent a basic system showing how the principle of operation of the means according to the invention links up with that forming the subject of the U.S. Patent No. 3,271,086 (patent application No. 315,334).

FIG. 3 relates to an embodiment of the invention applied to the case of rotating a shaft in its bearing (or of a carriage moving along a round slide), and FIG. 4 illustrates a second embodiment of the invention applied in a similar manner to that of FIG. 3.

FIG. 1 illustrates, in the case of the aforesaid patent, the principle of controlling the end position of the moving nozzle afforded by the corrector slide 1 in relation to a shaft 2 rotating in a reference body 3. The distance $a$ of the end of the corrector slide 1 from the moving body 2 can be regarded as the sum of the distance $b$ of the end of the corrector slide 1 from a reference surface 4 of the reference body 3 and of the distance $c$ of the reference surface 4 from the moving body 2.

In the case of the new means, diagrammatically illustrated in FIG. 2, the distance $c$ of the moving body 2 from the reference surface 4 continues to be measured at the same place in relation to a nozzle 5 forming part of the reference body 3 the end face of which merges with the reference surface 4 of FIG. 1. As regards the distance $b$ of the end of the corrector slide 1 from the reference surface, it is measured in relation to another reference surface 6 on the reference body 3, situated at some place on this member. The corrector is thus no longer obliged to be in the immediate proximity of the moving body 2 but its function is performed as if it were in fact situated at a fictitious distance from the moving body 2, equal to $b+c$, that is to say $a$ of FIG. 1.

In the arrangement illustrated in FIG. 3, a shaft 2, comprising the moving body, rotates about its axis in the bearing 3 forming part of the reference body. A small clearance separates the surfaces of the shaft 2 and of the bearing 3. Two chambers 7 and 8, provided on the interior surface of the bearing 3 in zones situated at the two ends of a diameter parallel with the direction of the external force acting upon the shaft 2, are each fed by an operating fluid circuit under variable pressure. After having passed through the chambers 7 and 8, the operating fluid in each circuit escapes through the clearance existing between the shaft 2 and projecting part 9, 10, 11 and 12 of the bearing 3, towards discharge grooves 13, 14, 15 and 16 communicating with the exterior. The passages 17 and 18 enable the operating fluid to be recovered if necessary.

The operating fluid pressure in the two circuits is regulated by a corrector contained in a casing 19 combined with a distributor 20 of the type described in the U.S. Patent No. 3,271,086 (patent application No. 315,334).

The corrector comprises a slide 21 moving in a bore of the casing 19 mounted at some point on the reference body. The slide 21 is fixed to the central part of a diaphragm 22 the periphery of which is clamped in the casing 19 and which separates two chambers 26, 33.

On opposite sides $s_1$ and $s_2$ of the diaphragm 22 there act the pressures in the two gas circuits based on the principle of the flow of a gas under pressure between two orifices and arranged in such a way that the said pressures depend directly upon the position of the slide 21 in its housing.

The first of these circuits, hereinafter called the principal circuit, is supplied by a gas under pressure which is fed through the passage 23. After having passed through a nozzle 24 having a cross-sectional area $O_1$, the gas enters a passage 25 and the chamber 26. Extending from this chamber 26 is a passage 27 which feeds a first nozzle 28 situated in the immediate proximity of the shaft 2 on the generatrix of the bearing 3 passing through the centre of one of the two chambers 7 or 8 but out of these chambers, and a second nozzle 29 mounted in the casing 19 of the corrector. The total area of the outlets from chamber 26 comprises the sum of the two following areas: the first $L_1 \times d_1$ represented by the clearance $d_1$ existing between the surface of the shaft 2 multiplied by the perimeter, of length $L_1$, of the orifice of the nozzle 28, the second $L'_1 \times d'_1$ represented by the clearance $d'_1$ existing between the face of a collar 30 on the slide 21 multiplied by the perimeter, of length $L'_1$, of the orifice of the nozzle 29 mounted on the casing 19. For a given supply pressure, the gas pressure $p_1$ acting on the upper surface $s_1$ of the diaphragm 22 and of the component for fixing it to the slide depends only on the value $L_1 \times d_1 + L'_1 \times d'_1$.

The other or secondary circuit is supplied from the same source of gas under pressure through the passage 23. After having passed through a nozzle 31 having a cross-sectional area $O_2$ the gas passes through a passage 32 into the chamber 33 defined within the casing 19. Extending from this chamber 33 is a passage 34 which supplied a nozzle 35 mounted on the casing 19. The total area of the outlet from chamber 33 is $L_2 \times d_2$, where $d_2$ is the clearance between the face of the collar 30 of the slide 21 and the perimeter of the orifice in nozzle 35, and $L_2$ is the length of the perimeter of nozzle 35. The gas pressure $p_2$ acting on the lower surface $s_2$ of the membrane 22 and of the component for fixing it to the slide 21 depends only on the value $L_2 \times d_2$.

The difference $d_0 = d_2 - d'_1$ in the distances of the two nozzles 35 and 29 from the face of the collar 30 of the slide 21 is constant by construction.

If a pressure $p_1$ acts on the surface $s_1$ and a pressure $p_2$ on the surface $s_2$, it is clear that the equilibrium of the slide 21 is only brought about if $p_1 \times s_1 = p_2 \times s_2$. For this reason the values of $O_1$, $L_1$, $L'_1$, $O_2$ and $L_2$ are so selected that the pressures $p_1$ and $p_2$ are always in inverse relation to the surfaces, $s_1$ and $s_2$ respectively, on which they act, and this whatever the feed pressure, it only being necessary that the shaft 2 shall occupy a predetermined position with respect to the bearing 3 such that the distance $d_1$ seprating the neighbouring walls of the two members is equal to the constant value $$d_1 = d_0 \times \frac{L'_1}{L_1}$$

Then if $L_1$ is equal to $L'_1$, $d_1$ becomes equal to $d_0$.

It can thus be seen that if the shaft 2 undergoes a simple displacement resulting in a variation in the pressure $p_1$, the slide 21, under the effect of the out-of-balance of the forces applied to it, itself undergoes a movement in a direction such that the initial variation in the pressure $p_1$ becomes amplified. In effect, when, for example, the pressure $p_1$ tends to increase, the slide 21 moves in a direction such that the output orifice of the principal circuit diminishes and this amplifies the initial increase in the value of the pressure $p_1$.

The distributor valve 20, intended to cause a change in the pressure of the operating fluid supplying the pressure chambers 7 and 8 as a function of the reactions of the corrector, upon any incipient movement of the shaft 2, is comprised of a slide 36 connected to the slide 21 of the corrector.

The operating fluid provided from a pressure source, not shown in the drawings, reaches the distributor through a passage 37. The input orifices through which the operating fluid enters the circuits supplying the chambers are formed by the clearances existing between the faces 39 and 40 of a shoulder on the slide and the corresponding cheeks, 41 and 42 respectively, of an entry throat 38. When the slide 36 moves, by following the movements of the corrector slide 21, one of the input orifices increases, whilst the other diminishes and vice versa. The operating fluid feeding the chamber 7 the pressure in which must increase when the shaft 2 tends to approach the neighbouring surface of the bearing 3 carrying the nozzle 28 and, conversely, must diminish when it tends to move away from it, passes through a clearance 43 between the slide 36 and the casing, then through the passage 44 and enters the chamber 7. The operating fluid which supplies the opposite chamber 8 enters it through the passage 45 after having passed through a clearance 46 between the slide 36 and the casing. The cylindrical parts 47 and 48 of the slide 36 prevent discharge towards the exterior of the operating fluid contained respectively in the clearances 43 and 46.

The operation of the equipment as a whole is as follows: if no external force acts on the shaft 2, the opposed forces applied in the two chambers 7 and 8 balance each other out. The operating fluid pressure is then the same in the two chambers 7 and 8 and the distributor slide 36 occupies its midway position, and this causes the corrector slide 21 to occupy a predetermined datum position. Thus the corrector slide 21 itself being in equilibrium, the shaft 2 occupies its predetermined position in relation to the bearing 3.

When an exterior force acts upon the shaft 2, for example in the direction tending to bring it close to the nozzle 28, the shaft 2 begins to move towards the nozzle 28. The principal pressure $p_1$ increases, since the flow section of the principal circuit diminishes, whilst the secondary pressure $p_2$ has not yet changed. The corrector slide 21 then moves collar 30 towards that part of the casing 19 carrying the nozzles 29 and 35, moving the distributor slide 36, the displacement of which causes an increase in the operating fluid pressure in the chamber 7 and a diminution thereof in the chamber 8. The opposed force acting on the shaft 2 increases up to the moment at which it balances the value of the external force. The shaft 2 is then returned to its predetermined initial position. When it reaches this, a new state of equilibrium is established characterised by the fact that the slides 21 and 36 occupy different positions from the initial position and that the principal pressure $p_1$ and secondary pressure $p_2$ do not have the same values as originally, but that the shaft 2 occupies the same predetermined position with regard to the bearing 3. When the external force acts in the opposite direction, the operation is similar.

In the direction perpendicular to that of the external force, the shaft 2 is supported by an identical arrangement or by a conventional fluid flow system the pressure of which varies as a function of the distance of the shaft 2 from the bearing 3.

FIG. 4 illustrates an embodiment which is slightly different from the preceding one, although it is based on the same principles. In FIG. 4, the parts that are the same as or identical with those described with regard to FIG. 3 have the same reference numerals.

A first difference between these two embodiments relates to the form of the input orifice for the gas in the principal and secondary circuits. Instead of comprising conventional nozzles, they are represented by the clearance existing between the bearing surfaces 49 and 50 respectively of the corrector slide 21, and the corresponding bores 51 and 52 of the casing 19. The gas flowing from the pressure source through the pipe 23 passes through the passage 53 into the throats 54 and 55, by way of which it enters the throttles comprising the input nozzles. The advantage of this arrangement resides in the complete elimination of leakage towards the exterior of the principal cavity 56 and the secondary cavity 57 which leakage can take place between the bearing surfaces of the corrector slide 21 and the corresponding bores of the casing 19. In the present arrangement any leakages towards the exterior and between the bearing surfaces of the corrector slide 21 and their bores, take place upstream of the input orifices and are therefore of no practical effect.

A second difference resides in the fact that on the corrector the output orifices for the principal and secondary circuits are comprised by the clearance existing between a face of the casing, 58 or 59 respectively, and the perimeter of the orifices of several nozzles, 60 and 61 respectively, distributed uniformly over a collar, 62 and 63 respectively, of the slide 21.

The flow of gas from the principal cavity 56 passes through an orifice 64 into a central passage 65 provided in the corrector slide 21 and from there, through the passage 66, into the nozzles 60. The gas flowing from the secondary cavity 57 passes through an orifice 67 into a second central passage 68 provided in the corrector slide 21 and from there, through the passage 69 into the nozzles 61.

It is to be noted that the existence, for each circuit, of several nozzles distributed uniformly at the same distance from the axis of the corrector slide 21 (an arrangement which can also be applied in the embodiment of FIG. 3), results in the avoidance of all lateral force upon the corrector slide 21 and in the facilitation of its sliding movement. In the distributor, the passage of the operating fluid is regulated by shoulders 70 and 71. This arrangement, similar to that shown in FIG. 3, can also be applied in the corresponding embodiment.

The operation of the system is the same as in the case of the preceding example.

The present invention can of course be applied not only in the embodiments that have just been described, but to all other possible embodiments and particularly to those mentioned in the U.S. Patent No. 3,271,086 (pat. appl. No. 315,334). Thus, the invention can equally be applied to the translatory displacement of a carriage on its guides or servo-control of a machine component, among other applications.

I claim:

1. Apparatus for keeping a clearance between two bodies substantially constant at a predetermined value, one of which bodies supports the other, through the intermediary of a pressure operating fluid in two zones opposite each other, against forces producing movements of said other body to alter said clearance, which apparatus comprises a source of pressure gas, control means having a casing which incorporates two chambers, a pressure sensitive element separating the two chambers from each other, and first and second restricted orifices placing the two chambers respectively in communication with said source, first and second outlets through which gas can escape from one of the chambers, a nozzle affording said first outlet and adapted to be fixed in one of said bodies adjacent a surface of the other body such that relative movement of the bodies altering said clearance alters the effective area of the first outlet, a third outlet through which pressure gas can escape from the other chamber, and means which is connected to move with the pressure sensitive element and which when so moved varies the effective areas of the second and third outlets in the same sense as the causal variation of the effective area of the first outlet, and a valve to which the element is coupled for varying the operating fluid pressures in the two zones in relation to each other in a sense to maintain the clearance at said predetermined value, variation of the clearance in either sense from said predetermined value producing a corresponding variation in the effective area of the first outlet which acts to move the element to operate the valve, the sizes of said orifices and outlets in relation to each other and the operation of the means for varying the effective areas of the second and third outlets being such that the opposing forces on the element are equal only when the clearance has said predetermined value and that, under steady conditions, the forces on the element are balanced when the clearance has said predetermined value whatever the position of the element.

2. Apparatus as claimed in claim 1, wherein the second and third outlets comprise respective apertures, and the means for varying the effective areas of these outlets comprise surfaces which face said apertures squarely, the distances of said surfaces from the respective outlets being varied in dependence on the position of the pressure sensitive element.

3. Apparatus as claimed in claim 2, wherein two oppositely extending rod members are slidably mounted in the casing of the control means and coupled to the pressure sensitive element, and, respectively extend through the two chambers, one of said rod members being coupled to the valve for transmitting movements of the element to the valve, and wherein, said first and second restricted orifices are annular and are defined by annular gaps formed between the two rod members and respective apertures which are provided in the casing and through which the rod members extend.

4. Apparatus as claimed in claim 3, wherein each of the rod members is tubular and has an aperture adjacent the element through which aperture the interior of the rod communicates with the chamber containing that member, and wherein the two rod members respectively provide said second and third outlets at their ends remote from the element, which ends move towards and away from fixed surfaces as the pressure sensitive element moves to actuate the valve.

5. Apparatus for keeping a clearance between two bodies substantially constant at a predetermined value one of which bodies supports the other, through the intermediary of a pressure operating fluid in two zones opposite each other, against forces producing movements of said other body to alter said clearance, which apparatus comprises a source of pressure gas, control means having a casing which incorporates two chambers, a pressure sensitive element separating the two chambers from each other, and first and second restricted orifices placing the two chambers respectively in communication with said source, first and second outlets through which gas can escape from one of the chambers, a nozzle affording said first outlet and adapted to be fixed in one of said bodies adjacent a surface of the other body such that relative movement of the bodies altering said clearance alters the effective area of the first outlet, a third outlet which is provided in the casing side by side with the second outlet and through which pressure gas can escape from the other chamber, said second and third outlets facing away from said one chamber, a rod connected to the pressure sensitive element and slidably mounted in the casing to extend through said one chamber a member mounted on the rod and having a surface squarely facing the second and third outlets, a valve comprising a valve housing having an inlet for pressure operating fluid and two outlets for respective connection to the two zones and a valve member mounted in the housing and adjustable to proportion the flow of pressure operating fluid between said outlets, a second rod which interconnects the element and the valve member, the sizes of said orifices and outlets in relation to each other and the operation of the means for varying the effective areas of the second and third outlets being such that the opposing forces on the element are equal only when the clearance has said predetermined value and that, under steady conditions, the forces on the element are balanced when the clearance has said predetermined value whatever the position of the element.

5. Apparatus for keeping a clearance between two bodies substantially constant at a predetermined value one of which bodies supports the other, through the intermediary of a pressure operating fluid in two zones opposite each other, against forces producing movements of said other body to alter said clearance which apparatus comprises a source of pressure gas, control means having a casing providing a first and a second chamber, a pressure sensitive element separating the two chambers from each other, a nozzle connected to form a first outlet from the first chamber and adapted to be fixed in one of said bodies adjacent a surface of the other body such that relative movement of the bodies altering said clearance alters the effective area of said first outlet, first and second tubular rods connected one to each side of the element and extending in opposite directions to each other through the first and second chambers respectively, a sealing slide mounting for each rod in the casing, a second outlet from the first chamber which outlet is formed in the first rod, communicates with the first chamber through the interior of the tubular rod and faces towards the first chamber and parallel to the rods, a surface fixed relative to the casing and squarely facing said second outlet, a third outlet which is provided by the second rod and through which gas can escape from the second chamber, said third outlet communicating with the second chamber through the interior of the second rod and facing away from the chambers and parallel to the rods, a surface fixed relative to the casing and squarely facing said third outlet, an annular cavity encircling each rod between the slide mounting of the rod and the chamber through which the rod extends and communicating with such chamber through an annular restricted aperture defined between the casing and the external surface of the rod, the two cavities communicating with said source whereby gas from the source flows through the two cavities and the restricted apertures into the respective chambers, and a valve to which one of the rods is coupled for varying the operating fluid pressures in the two zones in relation to each other in a sense to maintain the clearance at said predetermined value, the size of said restricted apertures and outlets in relation to each other and the operation of the means for varying the effective areas of the second and third outlets being such that the opposing forces on the element are equal only when the clearance has said predetermined value and that, under steady conditions, the forces on the element are balanced when the clearance has said predetermined value whatever the position of the element.

References Cited

UNITED STATES PATENTS 3,126,233    3/1964    Royle _____ 308—122
3,271,086    9/1966    Deffrenne _____ 308—122 X MARTIN P. SCHWADRON, *Primary Examiner.*

C. B. DORITY, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,403,948                          October 1, 1968

Paul Deffrenne

It is certified that error appears in the above identified patent and that said Letters Patent are hereby corrected as shown below:

Column 7, line 3, "5." should read -- 6. --.

Signed and sealed this 17th day of February 1970.

(SEAL)
Attest:

Edward M. Fletcher, Jr.
Attesting Officer

WILLIAM E. SCHUYLER, JR.
Commissioner of Patents